US006817776B2

(12) United States Patent
Colgan et al.

(10) Patent No.: US 6,817,776 B2
(45) Date of Patent: Nov. 16, 2004

(54) METHOD OF BONDING OPTICAL FIBERS AND OPTICAL FIBER ASSEMBLY

(75) Inventors: Evan George Colgan, Chestnut Ridge, NY (US); Robert W. Law, Poughquag, NY (US); Subhash Laxman Shinde, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 25 days.

(21) Appl. No.: 10/299,565

(22) Filed: Nov. 19, 2002

(65) Prior Publication Data

US 2004/0096163 A1 May 20, 2004

(51) Int. Cl.$^7$ ............................................. G02B 6/38
(52) U.S. Cl. ........................................................ 385/59
(58) Field of Search .............................. 385/59, 65–66, 385/71

(56) References Cited

U.S. PATENT DOCUMENTS

| | | | |
|---|---|---|---|
| 4,810,557 A | | 3/1989 | Blonder |
| 4,911,526 A | | 3/1990 | Hsu et al. |
| 4,923,275 A | | 5/1990 | Kaukeinen |
| 5,394,498 A | | 2/1995 | Hinterlong et al. |
| 5,548,677 A | * | 8/1996 | Kakii et al. ............... 385/92 |
| 5,689,599 A | | 11/1997 | Shahid |
| 5,742,720 A | * | 4/1998 | Kobayashi et al. ........... 385/89 |
| 6,219,484 B1 | * | 4/2001 | Rhee et al. ................. 385/137 |
| 6,290,864 B1 | | 9/2001 | Patel et al. |
| 6,472,126 B1 | * | 10/2002 | Traver et al. ............... 430/321 |

FOREIGN PATENT DOCUMENTS

| | | |
|---|---|---|
| JP | 61-181131 | 8/1986 |
| JP | 10-313128 | 11/1998 |

OTHER PUBLICATIONS

C. M. Schroeder "Accurate Silicon Spacer Chips for an Optical Fiber Cable Connector", The Bell System Technical Journal, vol. 57, No. 1, pp. 91–97 (Jan. 1978).
P. Chu et al "Controlled Pulse–Etching with Xenon Difluoride", 1997 International Conference on Solid–State Sensors and Actuators, Chicago, Jun. 16–19, 1997, IEEE 1997, pp. 665–668.
I. Chen et al "Gas Phase Pulse Etching of Silicon for MEMS with Xenon Difluoride", Proc. Of the 1999 IEEE Canadian Conference on Electrical and Computer Engineering, Edmonton, Alberta, Canada, May 9–12, 1999 pp. 1637–1642.
C.M. Miller, Fiber–Optic Array Splicing with Etched Silicon Chips, The Bell System Technical Journal, vol. 57 No. 1, pp. 75–90 (Jan. 1978).

* cited by examiner

Primary Examiner—Mark Tremblay
(74) Attorney, Agent, or Firm—Ira D. Blecker

(57) ABSTRACT

A method wherein optical fibers in a silicon connector are joined to a second optical component. The silicon connector is etched back with a dry etchant that is highly preferential for silicon to thereby etch the silicon connector much more than the optical fiber. After etching, the optical fibers protrude beyond the silicon connector so that they may be easily joined to the second optical component. Also disclosed is an optical fiber assembly made according to this method.

21 Claims, 5 Drawing Sheets

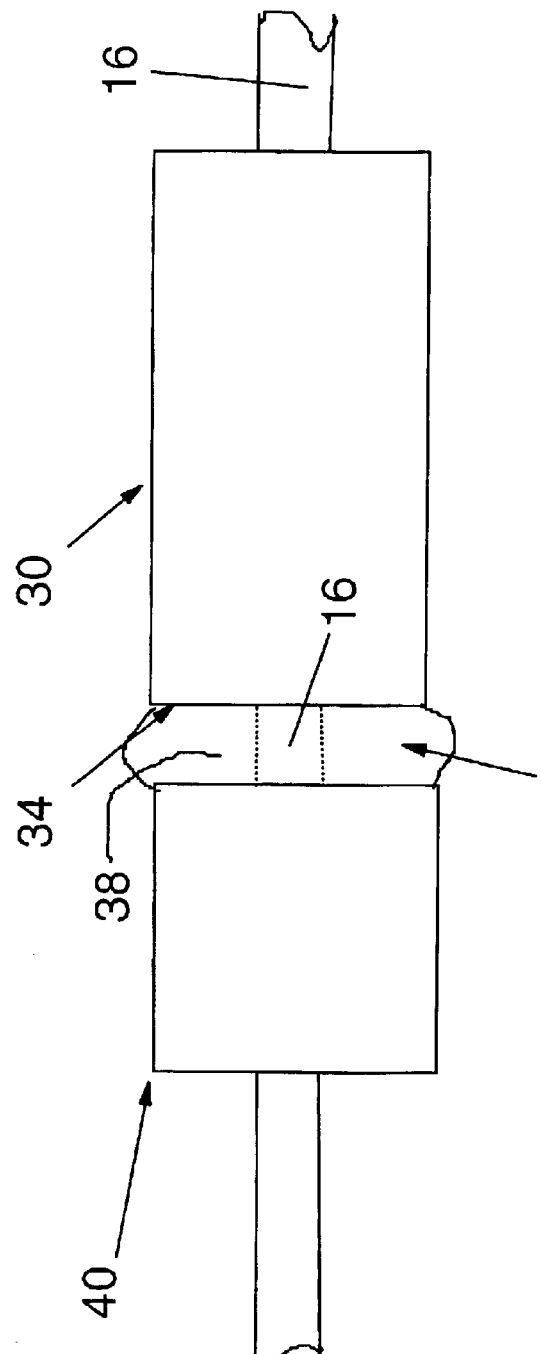
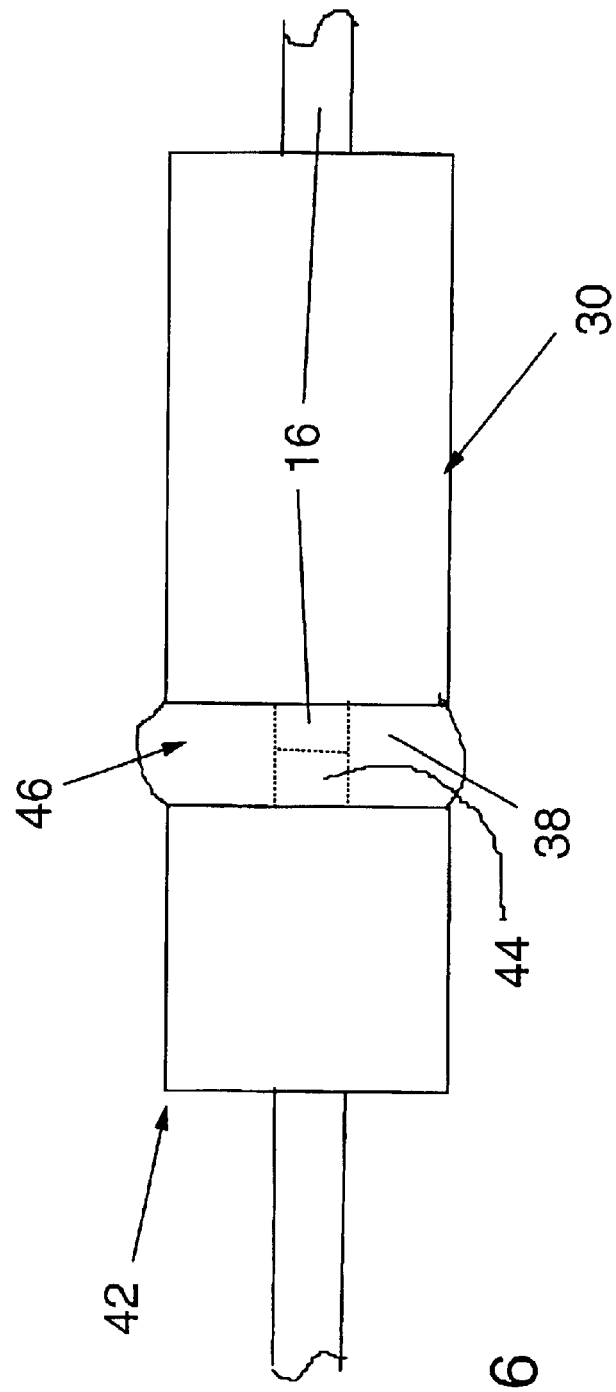

METHOD OF BONDING OPTICAL FIBERS AND OPTICAL FIBER ASSEMBLY

BACKGROUND OF THE INVENTION

The present invention is directed to the field of optical fibers and, more particularly, to a method of bonding adjoining optical fibers and the resulting optical fiber assembly.

For optical communications, it is usually necessary to align and join the ends of single, one dimensional array or two dimensional array of optical fibers with other optical fibers or other optical components such as detectors, light sources, and the like, one example being a planar lightwave circuit (PLC). A connector of some sort is necessary to hold the optical fiber(s) while being joined to the other optical fibers or other optical component. Frequently, such connectors use silicon "v" grooves, as such structures are readily fabricated by anisotropic etching of single crystalline silicon with high precision and silicon is a very rigid material with a low thermal coefficient of expansion. See, for example, C. M. Miller, "Fiber-Optic Array Splicing with Etched Silicon Chips, The Bell System Technical Journal, Vol. 57 No. 1, pp. 75–90 (January 1978); C. M. Schroeder "Accurate Silicon Spacer Chips for an Optical Fiber Cable Connector", The Bell System Technical Journal, Vol. 57, No. 1, pp. 91–97 (January 1978); Blonder U.S. Pat. No. 4,810,557; Hsu et al. U.S. Pat. No. 4,911,526; Kaukeinen U.S. Pat. No. 4,923,275; and Shahid U.S. Pat. No. 5,689,599, the disclosures of which are incorporated by reference herein, which generally disclose v-groove connectors.

A connector based on a silicon v-groove array is prepared by (1) etching the v-grooves into a silicon wafer and dicing it out from the wafer, (2) bonding the optical fiber(s) between a top and bottom v-groove array, and (3) grinding and polishing the mating end of the array so that the ends of the fiber(s) are coplanar with the edges of the v-grooves. For connectors which can be attached and detached, alignment pins or other structures are added to insure alignment. For permanent connections, an optically transparent adhesive, such as an ultraviolet (UV) light curable adhesive such as that disclosed in Hinterlong et al. U.S. Pat. No. 5,394,498, the disclosure of which is incorporated by reference herein, is applied to the end of the optical fiber(s) and the edge of the v-groove connector or other optical component (which may also be a second v-groove connector). The assembly of the v-groove substrate and other optical component then are "actively aligned" (i.e. the light transmission is monitored while adjusting the relative positions of one v-groove substrate to the other optical component to maximize the transmitted intensity) until the alignment is satisfactory, at which point, if a UV adhesive is used, the join is exposed to UV light to cure the join.

The use of UV adhesive has the significant advantage that the join can be made rapidly in the alignment jig with no temperature excursion. However, it is necessary to make the UV adhesive layer as thin as possible as the light transmission through the join decreases as the adhesive thickness is increased due to absorption by the adhesive and loss of light which is dispersed and hence no longer confined to the optical fiber. This leads to a significant problem because if an array of optical fibers held by a silicon v-groove substrate is being joined to another optical component which does not transmit UV light, it is difficult or impossible to properly expose and cure the UV adhesive forming the join if the layer is thin. This joining problem may be further complicated by the fact that the two mating surfaces (e.g. two v-groove arrays, or a v-groove array and another component) can not sometimes be brought into very close proximity (less than 10 microns) because they may not be at exactly a 90 degree angle to the fibers and or the optical circuitry.

It is generally known that silicon is preferentially attacked by various wet etchants (e.g., KOH) and dry etching processes (including but not limited to vapor phase etching (e.g., $XeF_2$), plasma etching and reactive ion etching (RIE)). "Dry etching processes" will be referred to hereafter as "dry etchants". $XeF_2$ is particularly preferred as a vapor phase etchant for silicon because of its very high selectivity for silicon (i.e., it etches silicon but little or no etching of $SiO_2$ or polymers). Further, dry etchants are preferred over wet etchants for photonics application. Such dry etchants are usually used for pattern definition and release of so-called microelectromechanical structures (MEMS) as disclosed in, for example, P. Chu et al. "Controlled Pulse-Etching with Xenon Difluoride", 1997 International Conference on Solid-State Sensors and Actuators", Chicago, Jun. 16–19, 1997, IEEE 1997, pp. 665–668; I. Chen et al. "Gas Phase Pulse Etching of Silicon for MEMS with Xenon Difluoride", Proc. of the 1999 IEEE Canadian Conference on Electrical and Computer Engineering, Edmonton, Alberta, Canada, May 9–12, 1999 pp. 1637–1642; Patel et al. U.S. Pat. No. 6,290,864; Hanmin et al. Japanese Patent Application JP10313128A; and Shinji et al. Japanese Patent Application JP611811311A, the disclosures of which are incorporated by reference herein.

It would be desirable to have an improved method for joining optical fibers to a second optical component.

Accordingly, it is a purpose of the present invention to have an improved method for joining optical fibers to a second optical component.

It is another purpose of the present invention to have an improved method for joining optical fibers to a second optical component in which the optical fibers are exposed for joining.

These and other purposes of the present invention will become more apparent after referring to the following description of the invention considered in conjunction with the accompanying drawings.

BRIEF SUMMARY OF THE INVENTION

The purposes of the invention have been achieved by providing, according to a first aspect of the present invention, a method of bonding optical fibers comprising the steps of:

obtaining a first optical component comprising a silicon connector;

placing at least one optical fiber in the connector;

obtaining a second optical component;

contacting the connector with a dry etchant which preferentially etches the silicon connector so as to cause the at least one optical fiber to protrude beyond the connector;

abutting the at least one optical fiber with the second optical component; and applying an adhesive to the abutting at least one optical fiber and second optical component.

According to a second aspect of the present invention, there is provided an optical fiber assembly comprising:

a first optical component comprising a connector having a first plurality of optical fibers wherein the first plurality of optical fibers protrudes beyond the connector;

a second optical component adjacent to the connector such that the protruding first plurality of optical fibers abut the second optical component; and an adhesive joining the abutting first plurality of optical fibers and the second optical component.

BRIEF DESCRIPTION OF THE DRAWINGS

The features of the invention believed to be novel and the elements characteristic of the invention are set forth with particularity in the appended claims. The Figures are for illustration purposes only and are not drawn to scale. The invention itself, however, both as to organization and method of operation, may best be understood by reference to the detailed description which follows taken in conjunction with the accompanying drawings in which:

FIG. 5 is a side view of a silicon connector according to the present invention joined to a second optical component.

FIG. 6 is a side view of a silicon connector according to the present invention joined to a second connector according to the present invention.

DETAILED DESCRIPTION OF THE INVENTION

Figure 1:
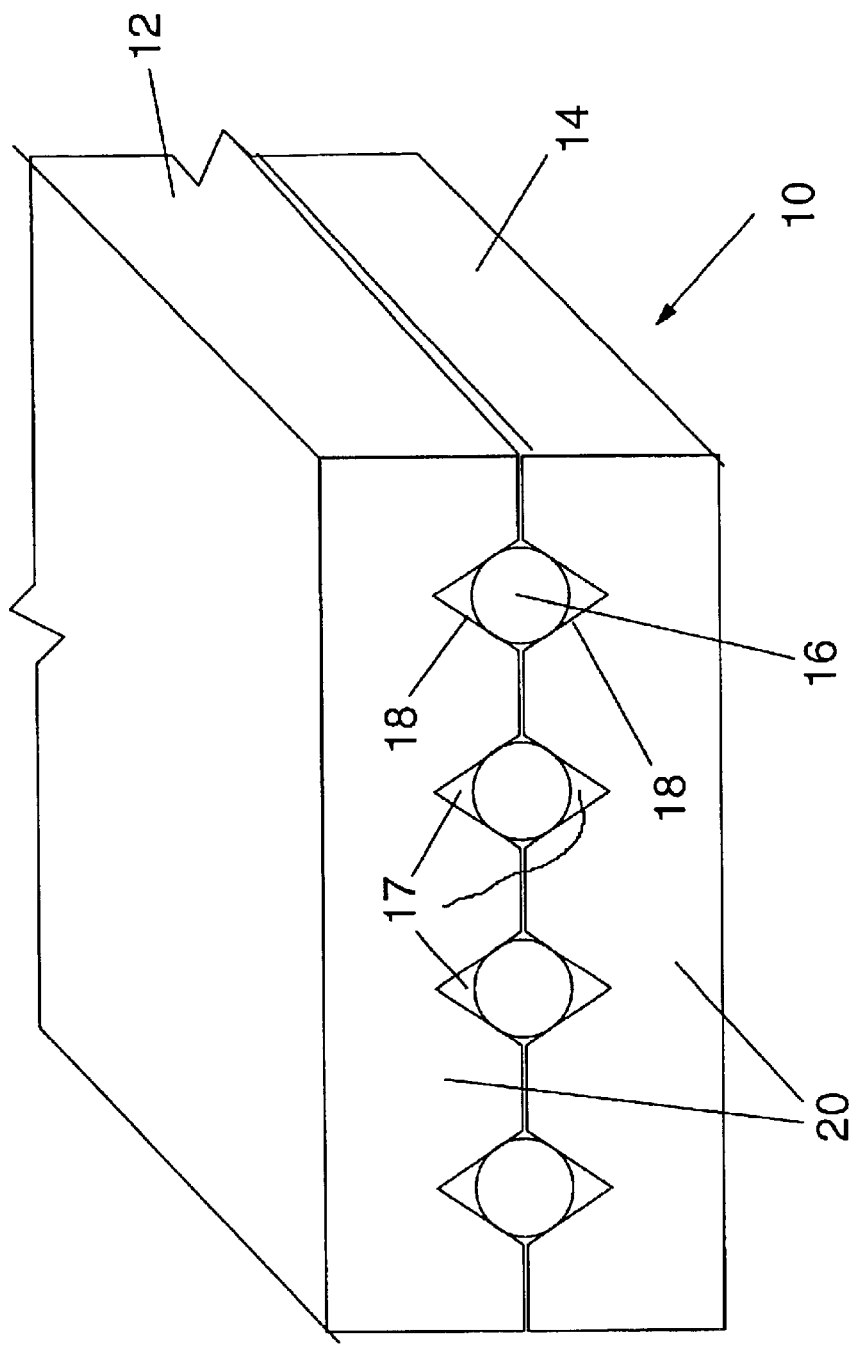
FIG. 1 is a perspective view of a prior art silicon v-groove connector.
Figure 2:
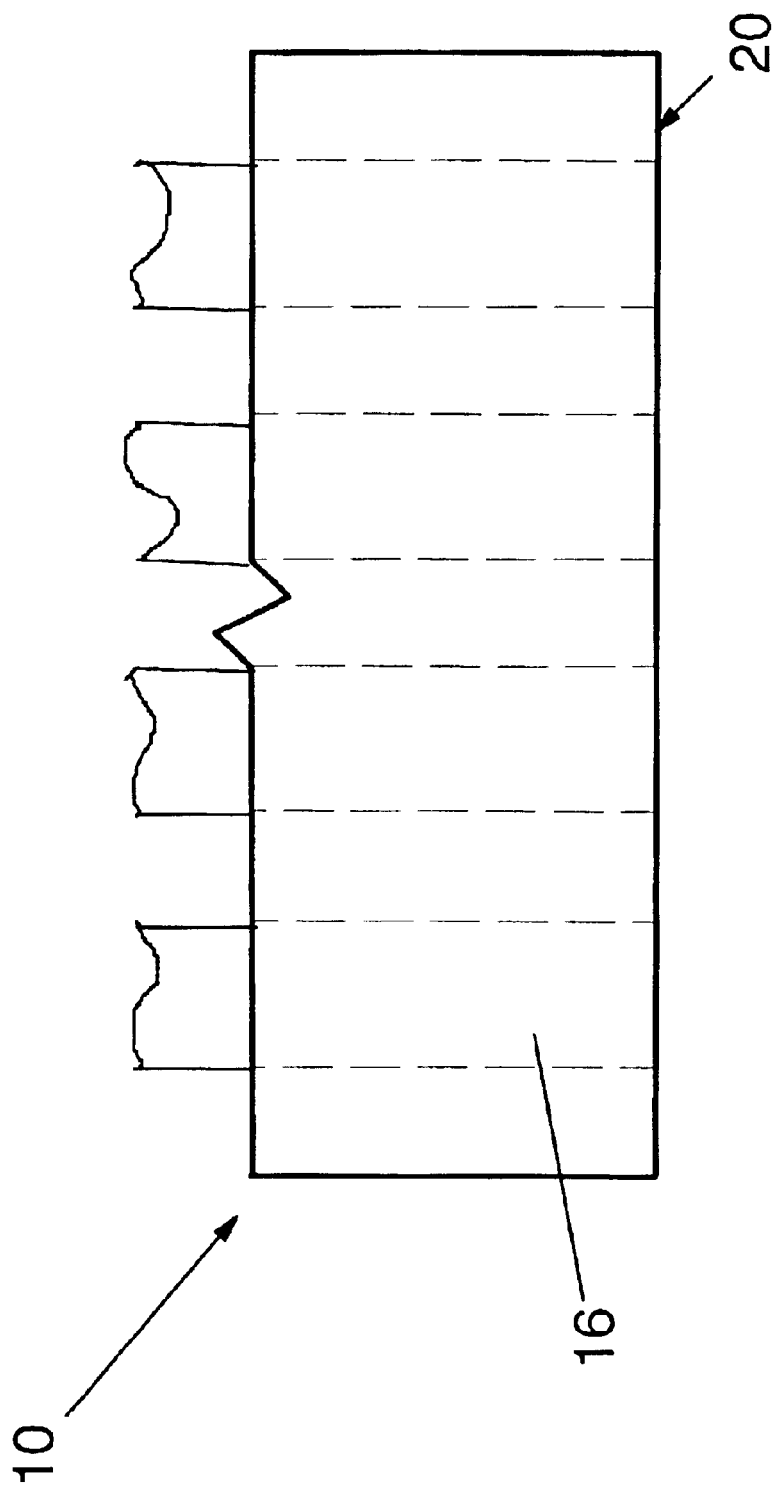
FIG. 2 is a top view of the prior art silicon v-groove connector of FIG. 1.

Referring to the Figures in more detail and particularly referring to FIGS. 1 and 2, there is shown a prior art silicon v-groove connector, generally indicated by 10. The silicon v-groove connector 10 consists of a top half 12, a bottom half 14 and v-grooves 18 for receiving at least one optical fiber 16. Usually there will be a plurality of such optical fibers 16. The v-grooves 18 accurately position the optical fiber 16 within the v-groove connector 10 and as well as with respect to other optical fibers 16 within the v-groove connector 10.

V-groove connector 10 is formed in a conventional manner. In general, to form a silicon v-groove connector 10, the buffer layer and the jacket layer (if one is present) are removed from a portion of a fiber optic ribbon, leaving a projecting portion of glass fibers 16. A pair of silicon v-groove arrays 12, 14 (may also be called silicon v-groove substrates) are prepared which are designed to match the fiber optic ribbon in number of fibers and spacing between fibers with appropriately sized individual v-grooves 18 for the individual fibers 16. The projecting optical fibers 16 are assembled between the pair of silicon v-groove arrays 12, 14 and bonded together using an appropriate adhesive 17 such as an epoxy which is flowed or "wicked" into the structure to form a silicon v-groove connector 10. After the adhesive has cured, the assembly is diced or ground to form a plane 20 which is perpendicular to the optical fibers 16. The end plane 20 thus formed is then further ground and polished. The silicon v-groove connector 10 which results from these processes are shown in FIGS. 1 and 2. As can be seen from FIG. 2, the optical fibers 16 are flush with the end plane 20 of the silicon v-groove connector 10.

The silicon v-groove connector 10 may also optionally contain a region (not shown) where the buffer layer and/or jacket material are secured to one or both of the silicon v-groove arrays 12, 14 on the side away from where the connection is formed to provide stress relief for the glass fiber 16 to avoid fracture at the end of the silicon v-groove connector 10 when the fiber 16 is bent or flexed. Further, such silicon v-groove connectors 10 may be used in an environmentally protected device such as an optical package. Alternatively, the silicon v-groove connector 10 may be exposed to the environment in which case it may be individually protected by surrounding it with a protective boot (not shown).

In the method according to the present invention, the silicon v-groove connector 10 shown in FIGS. 1 and 2 is exposed to a suitable etchant to etch back the silicon. The suitable etchant may be any dry etchant (e.g., vapor phase etching, plasma etching, RIE and the like) that etches silicon preferentially. $XeF_2$ (xenon difluoride) vapor phase etching is most preferred for the present invention because of its very high preferential etching of silicon and ease of processing. RIE or plasma etching methods would also work in the present invention but they are slower and the necessary equipment is more expensive.

When etching with $XeF_2$, the preferred operating condition is a pulsed mode, where the silicon v-groove connector 10 is exposed to vapor phase $XeF_2$ at about 1 Torr. After the etching cycle, the etch chamber is evacuated, sealed and recharged with XeF2. This cycle is repeated, along with occasional dry nitrogen purges, until the desired amount of silicon etching has occurred. When plasma etching or RIE, the most commonly used gases are $Cl_2$, $CCl_4$, $CF2Cl_2$, $CF_3Cl$, Br2, CF3Br and mixtures such as $Cl_2$—$C_3F_6$. The operating conditions are conventional.

Figure 3:
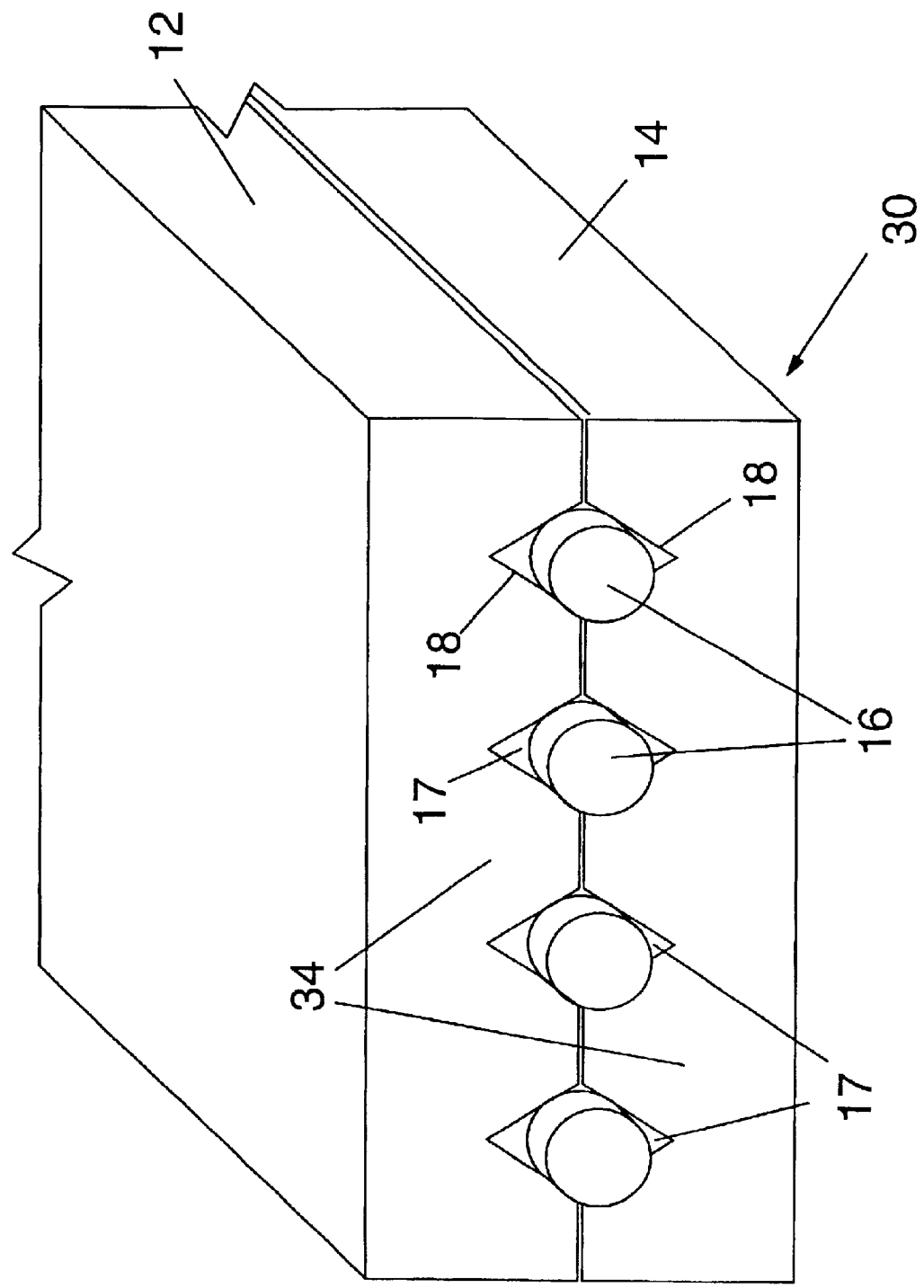
FIG. 3 is a perspective view of a silicon v-groove connector according to the present invention.
Figure 4:
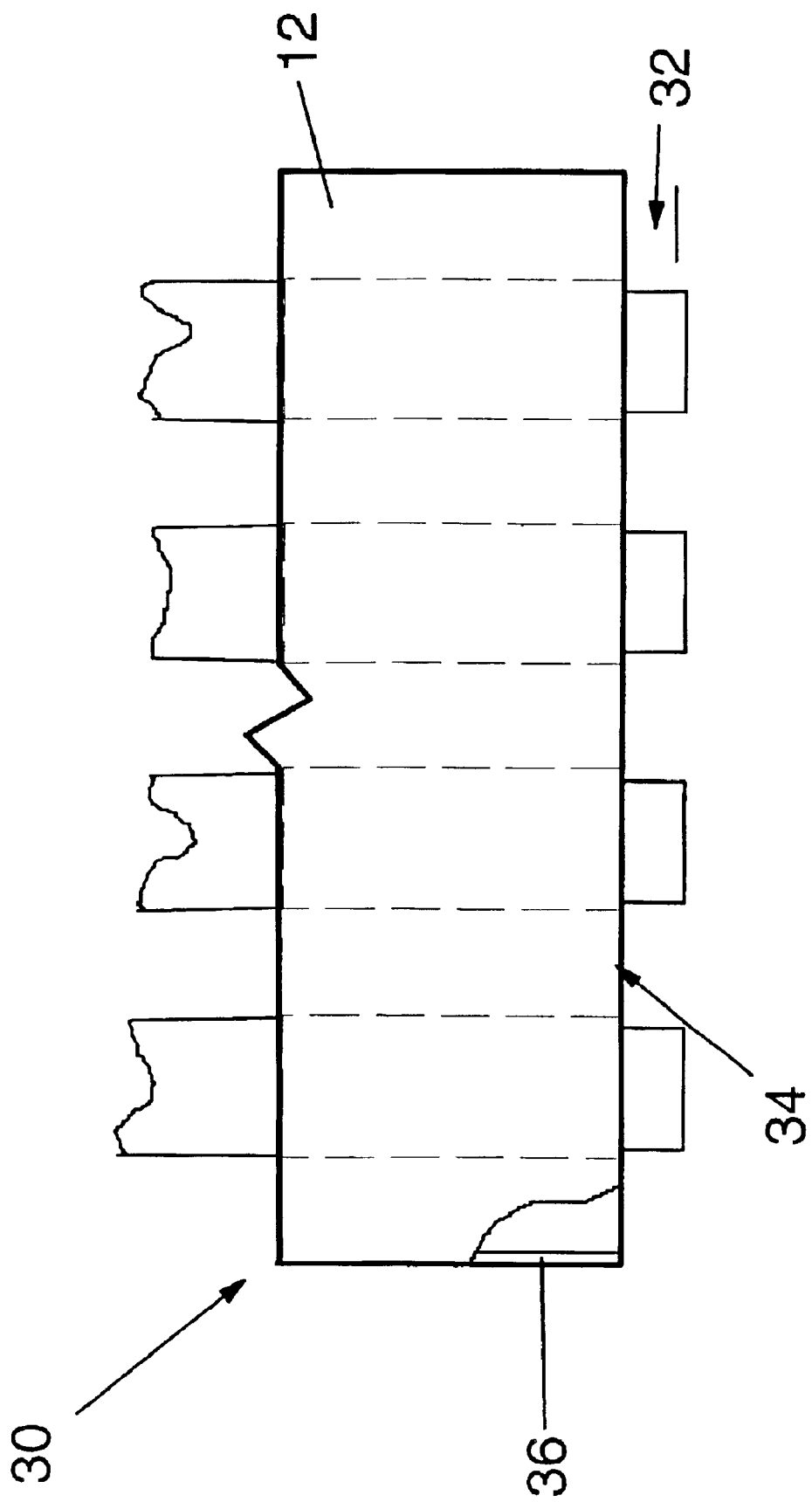
FIG. 4 is a top view of the silicon v-groove connector of FIG. 3.

After etching, the silicon v-groove connector 30, as shown in FIGS. 3 and 4, is thinned wherever the silicon comes in contact with the most preferred vapor phase etchant. If a RIE or plasma etch is used, the etching can be more directional and only the region exposed to the directional reactive ions would be etched. In particular, as shown in FIGS. 3 and 4, the end plane 34 has been recessed so that the optical fibers 16 now protrude beyond the end plane 34 of the silicon v-groove connector 30. The amount 32 (FIG. 4) that the optical fibers 16 protrude may be adjusted by limiting the amount of time the silicon v-groove connector 30 is in contact with the etchant. In general, it is preferred that the optical fibers 16 protrude 1 to 15 microns, and most preferably 5 to 15 microns, beyond the end plane 34. The amount of protrusion of the optical fibers 16 is also beneficial with respect to any nonplanarity (or other joining mismatch) of the mating surfaces to thereby give a larger gap between mating devices in which the optical fibers 16 are exposed which makes application of the bonding material to the optical fibers 16 easier and more effective.

If it is not acceptable for the entire silicon v-groove connector 30 to be exposed to the etchant, then the silicon v-groove connector 30 may be coated with a suitable coating to protect the silicon. This coating may be applied anytime prior to contact with the dry etchant and preferably when the two silicon v-groove arrays 12, 14 are initially formed. As shown in FIG. 4, the top v-groove silicon array 12 has been broken away to show protective coating 36. The protective coating 36 may be any protective coating that is resistant to the etchant. For example, if the etchant is $XeF_2$, the protective coating may be plasma enhanced chemical vapor deposited (PECVD) $SiO_2$ or $Si_3N_4$. Or, the silicon may be oxidized to form $SiO_2$.

Once the silicon v-groove connector 30 has been formed as shown in FIGS. 3 and 4, it may be joined with a second optical component. This second optical component may be, for example, a detector, light source, waveguide based device (e.g., gain equalizers, dispersion compensators and thermo-optic switches), photodiode array or laser diode array 40, as shown in FIG. 5, or a second silicon v-groove array 42 as shown in FIG. 6. Referring to FIG. 5, silicon v-groove connector 30 is abutted with a second optical component 40, for example a laser diode array. Due to the protruding of optical fiber 16 beyond end plane 34, optical fiber 16 easily abuts second optical component 40 while leaving a gap 46 of about 1 to 15 microns, and more preferably 5 to 15 microns, which may be filled with a suitable adhesive 38, preferably a UV curable adhesive or a UV/thermal adhesive (cures partially in UV light and fully cures in a subsequent thermal cure).

Referring now to FIG. 6, silicon v-groove connector 30 is abutted with a second silicon v-groove connector 42. As shown in FIG. 6, both of the silicon v-groove connectors 30, 42 have a protruding optical fiber 16, 44, respectively, which results in a gap of about 1 to 15 microns, more preferably 5 to 15 microns, which may be filled with a suitable adhesive 38, preferably a UV curable adhesive or a UV/thermal adhesive. It is also within the scope of the present invention for only one of the silicon v-groove connectors 30, 42 to have a protruding optical fiber 16 or 44.

It should be understood that while v-groove connectors are preferred for the present invention, other optical connectors will also work. Some of these other optical connectors are, for purposes of illustration and not limitation, MTRJ connectors, SC connectors, ST connectors, FC connectors or array connectors that may be designed using silicon to anchor the fibers precisely. Further, while v-groove connectors are preferred because the v-grooves may be easily formed in the silicon, other shapes for the grooves such as half-circles or half-squares may also be used. These other shapes may be formed by conventional micromachining and etching techniques.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

What is claimed is:

1. A method of bonding optical fibers comprising the steps of:
    obtaining a first optical component comprising a silicon connector;
    placing at least one optical fiber in the connector;
    obtaining a second optical component;
    contacting the connector with a dry etchant which preferentially etches the silicon connector so as to cause the at least one optical fiber to protrude beyond the connector;
    abutting the at least one optical fiber with the second optical component; and
    applying an adhesive to the abutting at least one optical fiber and second optical component.

2. The method of claim 1 further comprising the step of coating the connector with a material that is resistant to the etchant.

3. The method of claim 1 wherein there are a plurality of optical fibers in the connector.

4. The method of claim 1 wherein the silicon connector is a silicon v-groove connector.

5. The method of claim 1 wherein the dry etchant is vapor phase etching, plasma etching or RIE.

6. The method of claim 1 wherein the dry etchant is xenon difluoride.

7. The method of claim 1 wherein the at least one optical fiber protrudes by 1 to 15 microns.

8. The method of claim 1 wherein the adhesive is a UV curable adhesive.

9. The method of claim 1 wherein the second optical component is selected from the group consisting of detectors, light sources, waveguide-based devices, photodiode arrays and laser diode arrays.

10. The method of claim 1 wherein the second optical component is a second silicon connector having at least one optical fiber.

11. The method of claim 10 wherein the second silicon connector is a silicon v-groove connector.

12. The method of claim 10 further comprising the step of contacting the second connector with a dry etchant which preferentially etches the second connector so as to cause the at least one optical fiber to protrude beyond the second connector.

13. The method of claim 12 wherein the at least one optical fiber in the second. connector protrudes 1 to 15 microns.

14. The method of claim 12 further comprising the step of coating the second connector with a material that is resistant to the dry etchant.

15. An optical fiber assembly comprising:
    a first optical component comprising a connector having a first plurality of optical fibers wherein the first plurality of optical fibers protrudes beyond the connector;
    a second optical component adjacent to the connector such that the protruding first plurality of optical fibers abut the second optical component with a gap formed between the first and second optical components and the protruding optical fibers within said gap; and
    an adhesive in the gap joining the abutting first plurality of optical fibers and the second optical component.

16. The optical fiber assembly of claim 15 wherein the first plurality of optical fibers protrude 1 to 15 microns beyond the v-groove connector.

17. The optical fiber assembly of claim 15 wherein the adhesive is a UV curable adhesive.

18. An optical fiber assembly comprising:
    a first optical component comprising a connector having a first plurality of optical fibers wherein the first plurality of optical fibers protrudes beyond the connector;
    a second optical component adjacent to the connector such that the protruding first plurality of optical fibers abut the second optical component, wherein the second optical component is a second silicon connector having a second plurality of optical fibers, wherein the second plurality of optical fibers protrude beyond the second silicon connector and wherein the second plurality of optical fibers abut and join to the first plurality of optical fibers; and
    an adhesive joining the abutting first and second pluralities of optical fibers.

19. The optical fiber assembly of claim 18 wherein the silicon connector and the second silicon connector are silicon v-groove connectors.

20. The optical fiber assembly of claim 18 wherein the first and second plurality of optical fibers each protrude 1 to 15 microns.

21. The optical fiber assembly of claim 18 wherein there is a gap between the first and second optical components and the adhesive joining the abutting first and second pluralities of optical fibers is in the gap.

* * * * *